A. P. Gross,
Hanging Saws.
№ 16,643.  Patented Feb. 17, 1857.
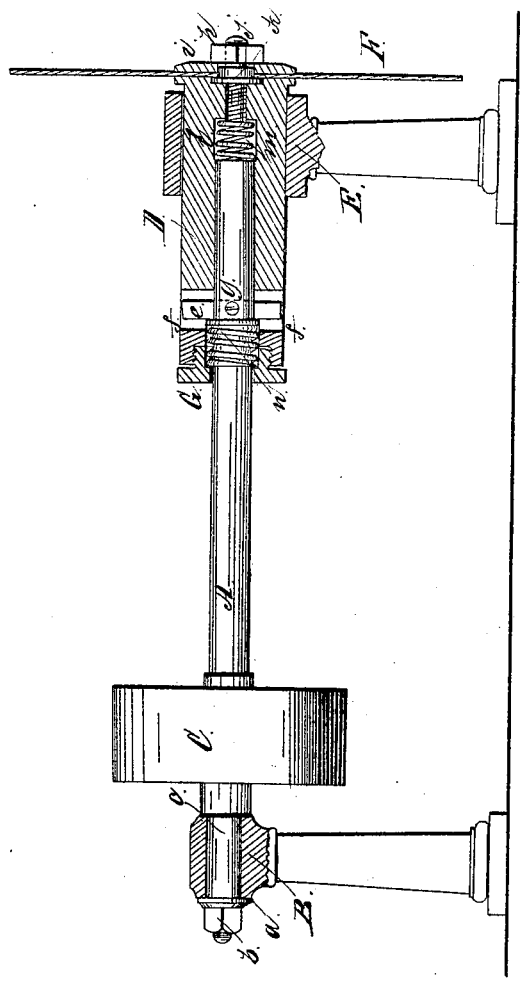

UNITED STATES PATENT OFFICE.

A. P. GROSS, OF ST. LOUIS, MISSOURI.

DEVICE FOR ALLOWING CIRCULAR SAWS TO PLAY LATERALLY INDEPENDENTLY OF THEIR SHAFTS.

Specification of Letters Patent No. 16,643, dated February 17, 1857.

*To all whom it may concern:*

Be it known that I, A. P. GROSS, of St. Louis, in the State of Missouri, have invented a new and Improved Expanding Mandrel or Arbor for Circular Saws; and I do hereby declare that the following is a full, clear, and exact description of the same, reference being had to the annexed drawing, making a part of this specification, said drawing being a longitudinal section of my improvement with saw attached.

My invention consists in giving the requisite degree of lateral play or movement to the saw, by attaching the saw to a sleeve or collar, which is placed in one end of the saw shaft, and using, in connection with the sleeve or collar, spiral springs, arranged as will be presently shown. The sleeve or collar is allowed to work or vibrate on the saw shaft longitudinally, to a certain extent; the saw shaft having no longitudinal movement or vibration.

To enable those skilled in the art to fully understand and construct my invention, I will now proceed to describe it.

A represents a shaft, one end of which is fitted in a bearing, B. The end of the shaft has a collar (*a*) upon it, which collar is fitted snugly against the outer end of the bearing, B, by a nut (*b*). A shoulder (*c*) is formed on the shaft, the said shoulder being fitted and working against the inner end of said bearing.

C represents a pulley on the shaft A, and D represents a sleeve or collar, which is placed on the end of the shaft A, opposite to the end which is fitted in the bearing, B. The sleeve is allowed to work or vibrate longitudinally on the shaft, the length of its vibration being controlled by a pin (*e*) which passes transversely through the shaft, A, and through oblong slots (*f*) in the sleeve. The pin (*e*) is secured to the shaft, A, by a screw (*g*).

The outer part of the sleeve, D, works in a bearing E, and the saw, F, is attached to the outer end of the sleeve, D, by a nut (*h*) which presses a collar (*i*) firmly against the center portion of the saw; the saw being clamped between the end of the sleeve D, and the collar (*i*). A screw (*j*) passes through the center of the saw; and the nut (*h*) is fitted on the outer end of this screw. The inner part of the screw passes into the end of the sleeve. A shoulder (*k*) is formed on the screw; said shoulder fitting in a recess in the end of the sleeve.

The end of the shaft, A, within the sleeve, D, does not extend to the end of the box or chamber, (*l*), of the sleeve; a space is allowed in which a spiral spring, (*m*), is placed. The outer end of the box or chamber (*l*) is made a trifle larger than the inner portion, to receive a spiral spring, *n*, which is placed around the shaft, A.

G represents a cap, which screws into the inner end of the sleeve, and which bears against the outer end of the spring (*n*).

The two springs, (*m*) (*n*), are made of sufficient strength to retain the saw, F, in a proper relative position with the log, and they will yield so as to allow the saw, when necessary, to be moved laterally, and conform to the grain of the wood of the log, and also to escape knots in the log, and other impediments; the saw being brought back to its original position by the springs when the above causes have ceased to act upon the saw. The saw is therefore prevented from being bent or broken, and will readily yield or move when acted upon by causes which produce irregular sawing.

The shaft, A, is prevented from moving or vibrating longitudinally by means of the collar (*a*) and shoulder (*c*); and consequently any irregular movement of the belt or driving pulley will not at all affect the saw.

I am aware that several devices have been employed for giving the saw a lateral yielding movement. The saw shaft or mandrel has been so arranged as to slide longitudinally in its bearings, and a spring applied to one or both ends of the shaft, and also arranged in other ways; but the objection to the devices previously employed is that the shaft or mandrel is acted upon by the irregular movement of the belt and pulleys which drive it; and consequently the saw is subject to be moved laterally when not required, and the log or "stuff" will be sawed unevenly.

By my improvement this difficulty is obviated and the work will be evenly sawed, except in those cases in which the saw is moved laterally by the action of the log upon it, and this movement is important to preserve the saw and keep it in proper working order.

The strength of the springs, (*m*) (*n*), may be graduated, as desired, by adjusting the cap, G, at the inner end of the sleeve, D; said cap, as it is screwed into the collar, compressing the springs and increasing their strength, and, as it is screwed out, allowing the springes to expand, and thereby decreasing their strength.

Having thus described my invention, what I claim as new, and desire to secure by Letters-Patent, is:

The shaft, A, in combination with the sleeve, D, and springs, (m) (n); the saw, F, being attached to the sleeve, D, and the shaft, A, secured in its bearing, B, as shown, so as to prevent a longitudinal movement of the same; the whole being arranged as described, for the purpose set forth.

A. P. GROSS.

Witnesses:
J. G. SIEMERS,
THOS. WALE.